United States Patent [19]

Bender

[11] Patent Number: 4,687,415
[45] Date of Patent: Aug. 18, 1987

[54] WIND TURBINE FRAME

[76] Inventor: Bruno Bender, P.O. Box 1679, Edmonton, Alberta, Canada, T5J 2N9

[21] Appl. No.: 861,685

[22] Filed: May 9, 1986

[51] Int. Cl.$^4$ ............................................. F03D 11/04
[52] U.S. Cl. ........................... 416/196 A; 416/DIG. 6
[58] Field of Search ............... 416/196 A, 196 R, 119, 416/DIG. 6

[56] References Cited

U.S. PATENT DOCUMENTS

| 154,407 | 8/1874 | Mason | 416/197 A X |
| 766,801 | 8/1904 | Allen | 416/197 A X |
| 802,144 | 10/1905 | Harrington | 416/197 A X |
| 1,015,695 | 1/1912 | Liston | 416/197 A X |
| 1,597,641 | 8/1926 | Walker | 416/119 |
| 1,974,008 | 9/1934 | Biehn | 416/197 A X |
| 2,224,851 | 12/1940 | Lea | 416/197 A X |
| 4,037,989 | 7/1977 | Huther | 416/197 A |
| 4,137,009 | 1/1979 | Telford | 416/119 |
| 4,245,958 | 1/1981 | Ewers | 416/197 A |
| 4,496,848 | 1/1985 | Binder | 416/197 A X |

FOREIGN PATENT DOCUMENTS

| 500348 | 6/1930 | Fed. Rep. of Germany | 416/197 A |
| 651571 | 2/1929 | France | 416/119 |
| 508969 | 1/1955 | Italy | 416/197 A |
| 21400 | 3/1930 | Netherlands | 416/197 A |

Primary Examiner—Everette A. Powell, Jr.
Attorney, Agent, or Firm—Harold H. Dutton, Jr.; George H. Dunsmuir

[57] ABSTRACT

Instead of the usual heavy structural elements or large collection of guy wires, a lightweight, portable frame for a wind turbine includes three inverted L-shaped inner frame sections supported by generally disc-shaped, heavy feet, and connected together at their top ends by a Y-shaped coupler, and three smaller inverted L-shaped outer frame sections also supported by feet and connected at their top ends to the inner frame sections, the inner and outer frame sections defining a Y-shaped structure when viewed from above. Additional strength is achieved be extending cables between the frame sections, i.e. by running a cable around the top and bottom of the Y-shaped structure.

5 Claims, 4 Drawing Figures

WIND TURBINE FRAME

BACKGROUND OF THE INVENTION

This invention relates to a wind turbine, and in particular to a frame for a wind turbine.

While there has been a great deal of activity in the area of wind powered engines and wind turbines for generating electricity, there is preciously little in the relevant literature concerning support structure. Preferably a wind turbine frame should be strong, lightweight and even portable. In general, existing structures sacrifice portability for strength, and are fixed, permanent installations.

The object of the present invention is to provide a relatively simple, yet strong, lightweight, portable frame for a wind turbine.

SUMMARY OF THE INVENTION

Accordingly, the present invention relates to a frame for a wind turbine comprising first skeletal frame means for supporting a central rotor and vanes, said first frame means including at least three first post means spaced equidistant apart around the periphery of the first frame means, and first crossbar means interconnecting said first post means, the posts of the first frame means lying on an imaginary vertical cylinder coaxial with the central rotor; and second skeletal frame means supporting said first frame means, said second frame means including second post means defining a cylinder larger than and co-axial with said first post means, and second crossbar means interconnecting said first and second post means for lending structural rigidity to the frame.

BRIEF DESCRIPTION OF THE DRAWINGS

The invention will now be described in greater detail with reference to the accompanying drawings, which illustrate a preferred embodiment of the invention, and wherein.

DESCRIPTION OF THE PREFERRED EMBODIMENT(S)

Figure 2:
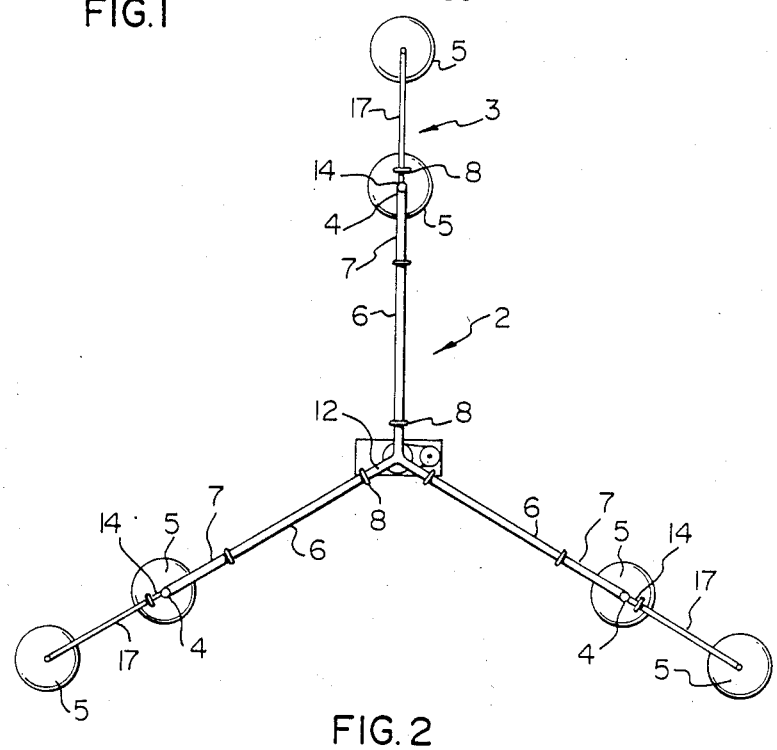
FIG. 2 is a plan view of the turbine frame of FIG. 1.

With reference to the drawings, the turbine frame of the present invention is intended to support rotors 1 for rotation around a vertical axis. The frame is defined by inner and outer skeletal cylinders generally indicated at 2 and 3. The inner cylinder includes three posts 4 supported by feet 5, and crossbars 6 extending between the top ends of the posts 4. The posts 4 and crossbars 6 are merely sections of tubing which are interconnected by tubular elbows 7. Annular flanges 8 (FIG. 3) are provided on the ends of the tubing sections and on the ends of the elbows 7. Nuts 10 and bolts 11 are used to connect the flanges 8 to each other. The top centre (FIG. 2) of the inner cylinder is defined by a Y-shaped tubular coupler 12, the outer ends of the arms of which also include annular flanges 8.

Sleeves 14 are welded to and extend radially outwardly from the bottom ends of the elbows 7, and from the bottom ends of the posts 4 for connecting the inner cylinder 2 to the outer cylinder 3. Like the inner cylinder 2, the outer cylinder 3 includes posts 16 and crossbars 17 extending from the top end thereof to the sleeves 14. The crossbars 17 are defined by the top arm of elbows 18, which extend between the sleeves 14 and a vertical pipe section 19. Annular flanges 8 are provided on the sleeves 14, the elbows 18 and pipe sections 19 for interconnecting such elements in the same manner as the elements of the outer cylinder 2. A sleeve 21 extends radially inwardly from the bottom of each pipe section 19 for receiving one end of a bottom cross-bar 22, the other end of which is received by the bottom sleeve 14 of the inner cylinder 2. Reinforcing cables 23 extend between the corners of the outer cylinder 3 for reinforcing the latter. Turnbuckles 24 are used to tighten the cables 23.

Figure 3:
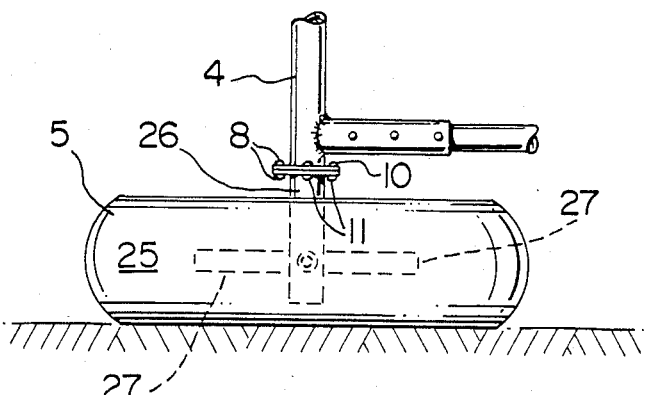
FIG. 3 is a side elevation view of a foot used in the turbine frame of FIGS. 1 and 2.

Feet 5 also support the pipe sections 19 of the outer frame 3. With reference to FIG. 3, each foot 5 is defined by a heavy base 25, and a tubular leg 26. In the present case a small tire is used to define the periphery of the foot 5. Tubular lugs 27 are welded to the leg 26, the bottom end of the leg 26 and the lugs 27 are placed in the centre of the tire, and the tire is filled with concrete.

Figure 4:
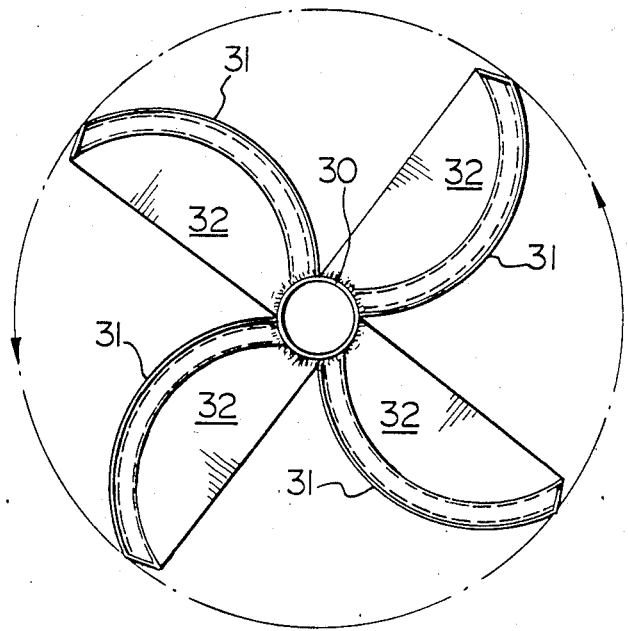
FIG. 4 is a plan view of a typical rotor used in the turbine frame of FIGS. 1 to 3.

Each of the rotors (FIG. 4) includes a central sleeve 30, and a plurality of arcuate vanes 31 extending outwardly therefrom. Plates 32 are provided on the top and bottom ends of the vanes 31 for reinforcing the latter. The rotors 1 are mounted on a centre mast 34, which extends between a concrete footing 35 and a top bearing plate 36. The mast 34 is tubular with a plug 37 in each end thereof. A pin 38 extends out of the plugs 37 into the top bearing plate 36 and a bottom bearing 39. A pulley 40 is provided on the bottom pin 38 for driving a generator 41. The pulley 40 is connected to the generator 41 by a belt 42. An emergency brake 43 is also provided on the bottom pin 37. Sleeve couplers 44 are provided on the mast 34, with tubular arms 46 extending outwardly therefrom for supporting the rotors. Diagonal braces 47 extend between sleeves 48 and 49 on the mast 34 and arms 46, respectively. Blades 50 are provided on the outer ends of the arms 46. The blades 50 are elongated elements with an airfoil cross-sectional configuration. The blades 50 are welded to sleeves 51, which are connected to the outer ends of the arms 46.

The frame is further strengthened by means of a cable (not shown) extending around each of the outer cylinders 2 and 3. The cable around the inner cylinder 2 extends around the posts 4 above the sleeves 14 on the elbows 7. The cable around the outer cylinders 3 extends around the posts 16 immediately above or below the flanges 8.

Figure 1:
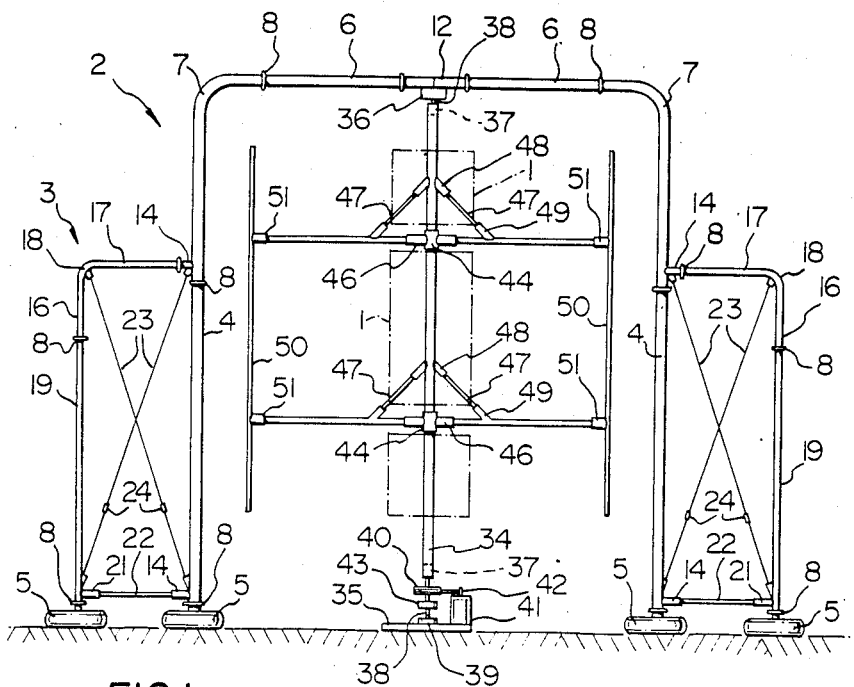
FIG. 1 is a side elevation view of a wind turbine frame in accordance with the present invention.

The structure described above is Y-shaped when viewed from above (FIG. 1), and in essence, is defined by a plurality of inverted L-shaped inner and outer frame sections all of which are supported by feet 5. The top ends of the inner frame sections are interconnected by the Y-shaped coupler 12. Straight lines (not shown) between the vertical arms of the inner frame sections would define a first equilateral triangle, and similar lines between the vertical arms of the outer frame sections would define a larger coaxial equilateral triangle. By using the flanges 8, nuts 10 and bolts 11, the frame can readily be assembled and disassembled. Thus, the frame can readily be moved from one location to another.

What I claim is:

1. A frame for a wind turbine comprising a first skeletal frame member for supporting a central rotor on a vertical axis, said first frame member comprising at least three vertical first post members spaced equidistant apart, an upper bearing support, and first horizontal crossbar members connecting said first post members and said upper bearing support, a second skeletal frame member for supporting said first frame member and including a plurality of second vertical post members equal in number to said first post members and spaced equidistant apart and radially outwardly of said first post members relative to said axis, second horizontal crossbar members connecting said second post members to said first post members for rigidifying said frame, and weighted ground supported foot members at the lower end of each of said post members.

2. A frame according to claim 1, wherein said first and second post means and said first and second crossbar means define inverted L-shaped frame sections.

3. A frame according to claim 2, wherein said foot members each comprise a heavy disc containing the bottom end of each said inverted L-shaped section.

4. A frame according to claim 2, including third crossbar means extending between the bottom ends of said first and second post means.

5. A frame according to claim 4, including first cable means extending between opposite ends of said second and third crossbars for reinforcing said second cylinder means.

* * * * *